United States Patent
Loeffler

(10) Patent No.: US 10,401,380 B2
(45) Date of Patent: Sep. 3, 2019

(54) WEARABLE SYSTEM FOR ACCELEROMETER-BASED DETECTION AND CLASSIFICATION OF FIREARM USE

(71) Applicant: THE TRUSTEES OF THE UNIVERSITY OF PENNSYLVANIA, Philadelphia, PA (US)

(72) Inventor: Charles Loeffler, Philadelphia, PA (US)

(73) Assignee: THE TRUSTEES OF THE UNIVERSITY OF PENNSYLVANIA, Philadelphia, PA (US)

(*) Notice: Subject to any disclaimer, the term of this patent is extended or adjusted under 35 U.S.C. 154(b) by 727 days.

(21) Appl. No.: 14/712,784

(22) Filed: May 14, 2015

(65) Prior Publication Data

US 2015/0338436 A1     Nov. 26, 2015

Related U.S. Application Data

(60) Provisional application No. 62/001,981, filed on May 22, 2014.

(51) Int. Cl.
| | |
|---|---|
| *G01P 15/18* | (2013.01) |
| *G01P 1/12* | (2006.01) |
| *G01P 1/02* | (2006.01) |
| *G01P 15/08* | (2006.01) |

(52) U.S. Cl.
CPC ............ *G01P 15/18* (2013.01); *G01P 1/023* (2013.01); *G01P 1/127* (2013.01); *G01P 15/0891* (2013.01)

(58) Field of Classification Search
None
See application file for complete search history.

(56) References Cited

U.S. PATENT DOCUMENTS

| | | | | | |
|---|---|---|---|---|---|
| 5,117,222 A | * | 5/1992 | McCurdy | ............... | G08B 21/22 340/539.1 |
| 6,497,170 B1 | * | 12/2002 | Kathe | ................... | F41A 21/36 89/14.2 |
| 7,143,644 B2 | * | 12/2006 | Johnson | .................. | F41A 19/01 73/167 |

(Continued)

OTHER PUBLICATIONS

Robert C. Maher, "Acoustical Characterization of Gunshots", Signal Processing Applications for Public Security and Forensics, 2007. SAFE'07. IEEE Workshop on. IET, 2007, pp. 1-5 (Year: 2007).*

*Primary Examiner* — Andrew Schechter
*Assistant Examiner* — Lina M Cordero
(74) *Attorney, Agent, or Firm* — Baker Botts L.L.P.

(57) ABSTRACT

A system for detecting and classifying firearm use comprising is provided. The system includes a wearable gunshot detection device and a remote monitoring system. The wearable gunshot detection device is configured to detect an acceleration of an extremity of an individual to which the gunshot detection device is attached, determine acceleration data based on the detected acceleration, and determine whether the acceleration data corresponds to a gunshot fired by the individual to which the gunshot detection device is attached. If the acceleration data corresponds to a gunshot fired by the individual to which the gunshot detection device is attached, then the wearable gunshot detection device transmits the acceleration data to the remote monitoring system.

20 Claims, 2 Drawing Sheets

(56) References Cited

U.S. PATENT DOCUMENTS

| | | | |
|---|---|---|---|
| 7,180,425 B2 * | 2/2007 | Yuasa | G01P 1/127 340/669 |
| 7,266,045 B2 | 9/2007 | Baxter et al. | |
| 7,292,501 B2 | 11/2007 | Barger | |
| 7,420,878 B2 | 9/2008 | Holmes et al. | |
| 7,433,266 B2 | 10/2008 | Lédeczi et al. | |
| 7,719,428 B2 | 5/2010 | Fisher et al. | |
| 8,036,065 B2 | 10/2011 | Baxter et al. | |
| 8,571,815 B2 | 10/2013 | Bar-david et al. | |
| 9,163,894 B1 * | 10/2015 | Reardon | F41A 33/02 |
| 2005/0040944 A1 * | 2/2005 | Contestabile | G08B 21/0269 340/539.13 |
| 2007/0288157 A1 * | 12/2007 | Peterman | G01C 21/30 455/404.1 |
| 2008/0016744 A1 * | 1/2008 | Joannes | F41A 19/01 42/1.01 |
| 2008/0281550 A1 * | 11/2008 | Hogle | A61B 5/1038 702/127 |
| 2009/0069642 A1 * | 3/2009 | Gao | A61B 5/02055 600/300 |
| 2010/0246328 A1 | 9/2010 | Gudgel et al. | |
| 2010/0298650 A1 * | 11/2010 | Moon | A61B 5/0002 600/301 |
| 2010/0321186 A1 * | 12/2010 | Crook | G08B 13/149 340/568.6 |
| 2011/0224564 A1 * | 9/2011 | Moon | A61B 5/00 600/509 |
| 2012/0144711 A1 * | 6/2012 | Glock | F41A 19/01 42/1.03 |
| 2012/0183930 A1 * | 7/2012 | Dribben | F41G 3/26 434/19 |
| 2013/0329047 A1 | 12/2013 | Jankowski et al. | |
| 2014/0270375 A1 * | 9/2014 | Canavan | A63B 24/0062 382/103 |
| 2015/0177363 A1 * | 6/2015 | Hermann | G01S 5/20 367/118 |
| 2016/0025525 A1 * | 1/2016 | Jin | G01P 1/023 73/431 |
| 2016/0157032 A1 * | 6/2016 | Kane | H04R 3/00 381/56 |

* cited by examiner

WEARABLE SYSTEM FOR ACCELEROMETER-BASED DETECTION AND CLASSIFICATION OF FIREARM USE

CROSS REFERENCE TO RELATED APPLICATION

This application is related to, and claims priority from, Provisional Patent Application No. 62/001,981, entitled "Wearable System For Accelerometer-Based Detection And Classification Of Firearm Use, which was filed on May 22, 2014, and the entire contents of which are incorporated by reference herein.

BACKGROUND

Gun violence remains a persistent problem in many communities. Each year, over 8,000 individuals are murdered with firearms in the U.S. The traditional police response to this social problem, increased deployment to suppress gunfire, is difficult to sustain in today's fiscal climate.

Therefore, many jurisdictions have focused their enforcement efforts on monitoring the subset of individuals at highest risk of involvement in fatal shootings based on research showing that the majority of both homicide victims and perpetrators are on probation, parole, or pretrial release. However, this approach can be labor intensive and existing monitoring technologies (e.g., radio frequency or global positioning system bracelets), can lead to information overload for officers in the absence of clear signals that the monitored individuals are at the location of a reported gun crime, which occurs in less than half of all outdoor gun discharges. While the scale of this problem suggests the need for a range of policy responses, an opportunity exists for advanced offender monitoring technology using low-cost wearable sensors to enhance public safety by detecting illegal firearm usage by individuals already under the supervision of the criminal justice system.

Certain prior work on gunshot detection has either focused on shooter localization using acoustic triangulation or localization of muzzle flashes using infrared cameras. In the domestic application, acoustic triangulation has been the most common implementation with distributed microphone networks constructed to provide location information for gunshot events in covered areas. An acoustic approach was disfavored in the current invention due to the difficulty of separating handgun-generated muzzle blasts from other impulsive acoustical events, even at close range, and the challenges of attributing a localized muzzle blast to the wearer of a sensor.

SUMMARY

In one embodiment, a system for detecting and classifying firearm use is provided. The system includes a wearable gunshot detection device and a remote monitoring system. The wearable gunshot detection device is configured to detect an acceleration of an extremity of an individual to which the gunshot detection device is attached, and to determine acceleration data corresponding to the detected acceleration.

The wearable gunshot detection device can be further configured to determine whether the acceleration data corresponds to a gunshot fired by the individual to which the gunshot detection device is attached and, if the acceleration data corresponds to a gunshot fired by the individual, to log or transmit the acceleration data to the remote monitoring system.

DETAILED DESCRIPTION

Figure 1:
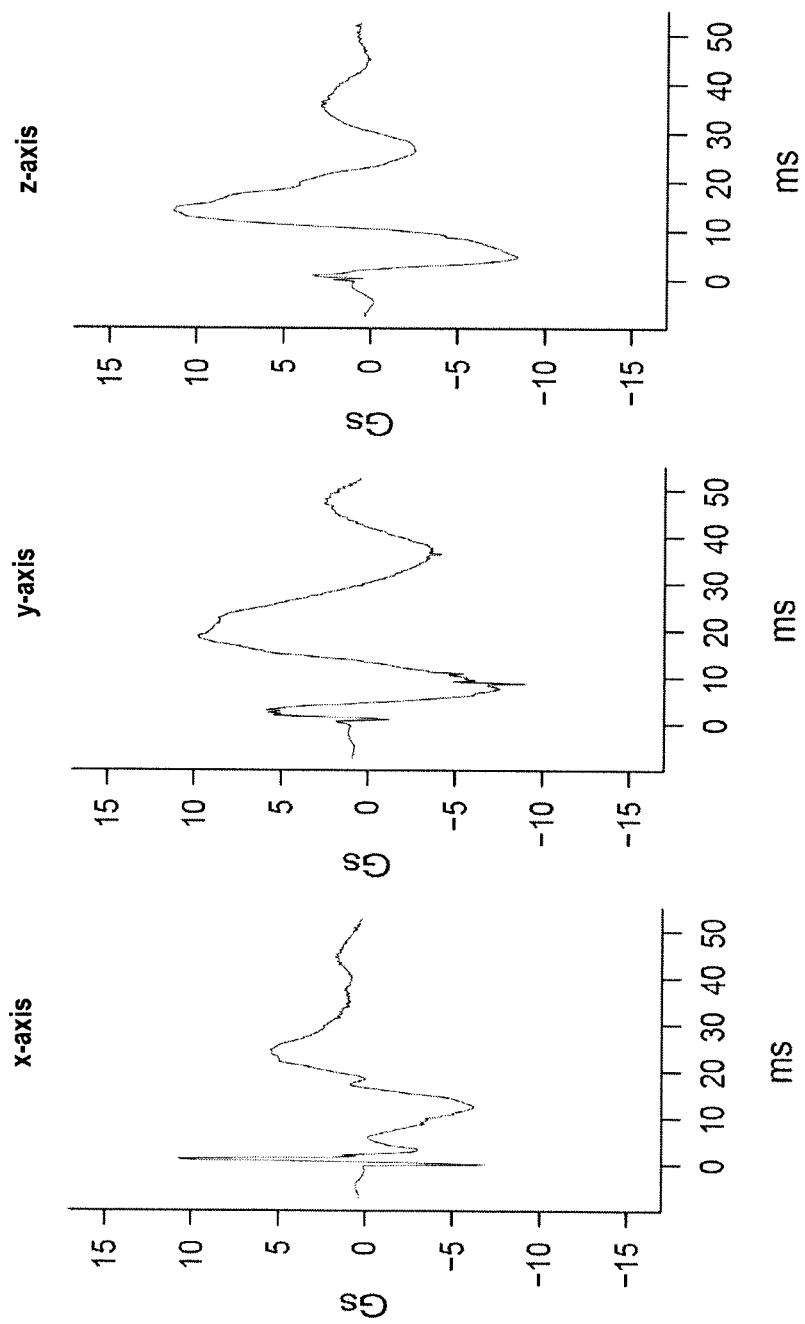
FIG. 1 depicts graphs that illustrate acceleration patterns of an extremity of an individual along different axes of a tri-axis coordinate system, where the acceleration patterns occur following the firing of a gunshot by the individual.

A motion-based wearable gunshot detection framework is disclosed herein. Researchers have previously achieved success using wearable accelerometers to detect and classify commonplace human behaviors. In addition, they have recently demonstrated the potential of wearable accelerometers to detect fall events, seizures, and concussive head trauma from a continuous stream of movement data. To date, however, such sensors have not been used to classify firearm use. As a result, the only knowledge of the forces acting upon the wrist during gunshot events comes from studies of firearm movement in controlled settings using load sensors, studies of human physiological response to blast pressure and other recoil-related forces, and calculations of felt recoil under theoretical conditions. Even when detailed investigations have been made of the firearm-human system, most studies have analyzed shoulder-fired weapons rather than hand-fired weapons and examined their effects on shooter performance rather than shooter kinematics.

Nevertheless, such studies provide several important insights into the physics of firearm use which aid in the classification of wrist movement during gunshot events. First, gunshot events, from the perspective of the shooter's wrist, occur when the wrist is either at rest or constant acceleration in the fraction of a second before discharge. This results from the need to aim the gun in the direction of fire. Once the trigger is pulled, there is a sudden change in acceleration. This jerk motion has little in common with other human-initiated activities, which generally involve the gradual acceleration of the wrist prior to peak acceleration (e.g., tennis swings, hand claps, punches, hammering). Instead, this motion has much more in common with other impulse transfer events that involve the hand and arm, including the hand being struck by a fast moving blunt force object or a high-impact tool. The relative rarity of such impacts can provide much of the separation needed to reliably detect gunshots. However, when confusable events do occur, they are unlikely to overlap substantially with gunshots due to the following three components of gun discharges: blast wave, recoil, and muzzle lift. Each component is investigated in more detail below.

First, only about 30% of the chemical energy in a bullet's propellant cartridge is converted to kinetic energy transferred to the projectile. This means that the majority of the cartridge propellant is released in the gaseous muzzle blast mixture that accompanies the projectile's exit from the firearm barrel. The resulting muzzle blast, generated by the collision of the rapidly expanding gases with the slower moving air previously surrounding the barrel of the firearm, forms a spherically propagating blast wave. While this blast over-pressure/under-pressure wave will degrade into an acoustical wave within a short distance, prior to doing so it can be detected as a sudden spike in amplitude when recorded by acoustical microphones and as a sudden spike in acceleration when recorded using microelectromechanical systems (MEMs) accelerometers. An example of such a gunshot generated blast wave is visible at 0 seconds in the graphs depicted in FIG. 1, with the clearest wave pattern present on the X-axis corresponding to acceleration along the forearm from wrist to elbow.

Next, recoil of hand-held firearms results from the transfer of energy and momentum from the propellant to the cartridge case to the firearm breach and then onto the hand and arm. This rearward impulse can be substantial, but it is only applied for the length of time that the projectile remains in the firearm barrel, which will be roughly one millisecond in duration, assuming an average bullet speed of 405 feet per second and a barrel length of five inches. For the purposes of the present application, one attribute of recoil is the timing of this rearward impulse rather than its magnitude, which likely overlaps with other impulsive events.

This force may not immediately act upon the wrist. Instead, a small delay will precede the transmission of this impulse to the wrist as the gun compresses the soft tissue of the hand. The estimated length of this delay for a shoulder-fired weapon, derived from high speed photography, is approximately 20 to 50 milliseconds. Given the reduced soft tissue on the hand relative to the shoulder, it is likely that this delay will be even shorter for hand-fired weapons. This sequence of events is subject to slight alteration if the weapon being fired contains a recoil absorbing mechanism, such as a self-loading semi-automatic pistol. For an example of peak recoil force, see FIG. 1 at approximately 14 milliseconds on the X-axis.

Finally, during the period when the projectile is moving forward but still within the barrel of the firearm, the rearward pressure of the shell casing on the breach of the firearm is pushing the firearm backwards. Since the center of mass of the firearm is below the plane of the barrel, this force also generates a rotational force about the center of mass, which is located somewhere along the arm of the shooter with the exact location determined by the degree of joint lock and bracing. This rotational force is what generates muzzle lift. In practice, there are only small amounts (fractions of an inch) of upward movement of the weapon-human system and therefore the wrist. Like recoil, this motion occurs over a short period of time and it is therefore likely to be observable as a single-positive-peak in the vertical plane occurring just after peak recoil. Also like recoil, it occurs in too short a time for the human body's neuromuscular system to respond. An example of peak muzzle lift can be seen at approximately 18 milliseconds in FIG. 1 on the Y-axis, corresponding to the vertical plane running from the base of the hand up through the tip of the thumb.

Additional features of gunshot events and related wrist motions, such as those seen in the Z-axis of FIG. 1 corresponding to the plane running through and perpendicular to the palm of the hand, will also contribute to the classification of gunshot events.

Figure 2:
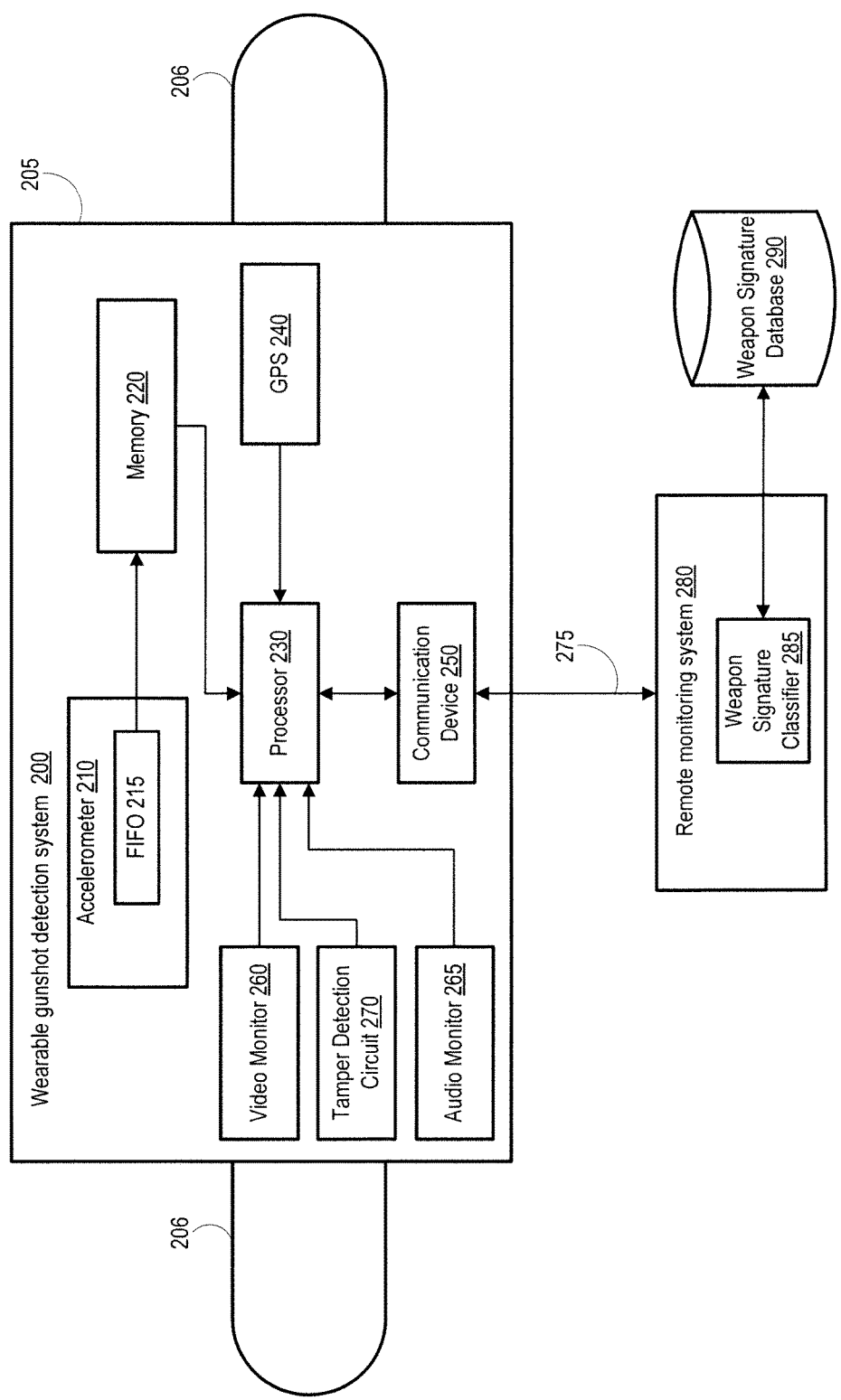
FIG. 2 is a functional diagram of a wearable gunshot detection and classification system, according to one or more embodiments.

FIG. 2 is a functional diagram that depicts a gunshot detection and classification system, according to one or more embodiments. Components of the depicted system include a wearable gunshot detection system 200 and a remote monitoring system 280. Gunshot detection system 200 communicates with remote monitoring system 280 over communication link 275. Details of each component are described herein with reference to FIG. 2.

An example gunshot detection system 200 includes a housing 205 that encloses sub-components that operate in a coordinated manner to detect gunshot events when the system is attached to a monitored individual. To enable attachment of gunshot detection system 200 to a person, housing 205 is attached to a strap 206. Strap 206 may be fastened around an extremity of an individual (for example, the right or left wrist) and is at least partially composed of a material capable of conducting electrical or optical signals (not shown in the figure). The signal conducting material may be a fiber-optic loop or a metallic conductor and is located beneath the surface of strap 206. According to embodiments, strap 206 is electrically connected to a tamper detection circuit 270 situated within housing 205.

As shown in FIG. 2, tamper detection circuit 270 detects a signal cut off from strap 206. Thus, if a wearer of strap 206 cuts or otherwise damages the strap, tamper detection circuit 270 is configured to detect an interruption of the signal flow in strap 206. Tamper detection circuit 270 then notifies a remote operator (e.g., a law enforcement authority) of a potential tampering incident. In some embodiments, notification occurs using other components depicted in FIG. 2 (such as processor 230 and communication device 250) in order to communicate that strap 206 has been tampered with. These other components are described further below.

As shown, housing 205 encloses accelerometer 210. Accelerometer 210 operates with a sampling frequency sufficient to detect accelerations that are consistent with firearm usage. Such accelerations are referred to as ballistic spikes. For example, accelerometer 210 detects accelerations that are consistent with the initial blast wave that occurs immediately following the firing of a gun, as well as the recoil acceleration that occurs after a number of milliseconds have elapsed after the time of firing. These ballistic spikes are measured in the direction of the X-axis depicted in FIG. 1 (i.e., in the direction from the wrist along the forearm to the elbow of the wearer of gunshot detection system 200). Further, accelerometer 210 detects the muzzle lift phenomenon that typically occurs when a gun is fired. This acceleration is measured in the direction along the vertical plane that runs from the base of the hand through the tip of the thumb, represented by the Y-axis in FIG. 1.

According to embodiments, accelerometer 210 includes a first-in first-out (FIFO) buffer 215 that stores a quantity of acceleration data that corresponds to the accelerations measured by the accelerometer. In other embodiments, accelerometer 210 may not include a FIFO buffer. In such a case, FIFO 215 would be deployed within housing 205 as a component that is separate from the accelerometer. Referring to FIG. 2, FIFO 215 may have capacity to store up to 60 milliseconds of acceleration data. Accelerometer 210 is configured to analyze the data stored in FIFO 215 to detect ballistic spikes that are likely to have been caused by gunshot events. For instance, if the data stored in FIFO 215 indicates that a 1.5 G acceleration in the direction of the X-axis was preceded by a sub-1.5 G acceleration along the same axis at some point during a 600 microsecond time period, then accelerometer 210 determines that the detected acceleration is potentially caused by a gunshot. When accelerometer 210 makes this determination, an amount of acceleration data that includes the detected ballistic spike is transferred from FIFO 215 to memory 220. For example, accelerometer may transfer 50 milliseconds of acceleration data from FIFO 215 to memory 220, where 25 milliseconds of the transferred data precedes the ballistic spike and 25 milliseconds of the transferred data follows the ballistic spike. The transfer of data "surrounding" the ballistic spike assists gunshot detection system 200 in further determining whether the spike was indeed caused by a gunshot.

According to embodiments, memory 220 is either a volatile or non-volatile memory unit that is capable of storing data and executable programs. Once accelerometer 215 transfers data to memory 220, the accelerometer sends an interrupt command to processor 230 to notify the processor that acceleration data has been stored for further processing.

Processor 230 is a general purpose central processing unit (CPU) that reads data from, and executes programs stored in, memory 220. Upon being notified that acceleration data has been stored in memory 220, processor 230 loads software modules (also stored in memory 220) and executes these modules to further analyze the acceleration data. For example, processor 230 analyzes the acceleration data stored in memory 220 by dividing the memory into three segments: a pre-spike time period, a time period corresponding to the ballistic spike itself, and a post-spike time period. A representative interval for the pre-spike time period is approximately 7.5 milliseconds prior to the occurrence of the ballistic spike. A representative interval for the post-spike time period is an interval that begins one millisecond after the occurrence of the spike and ends 45 milliseconds after the occurrence of the spike.

In one or more embodiments, processor 230 analyzes the pre-spike period by calculating the sum of the differences between an overall measured tri-axis acceleration vector and the acceleration due to gravity. Further, processor 230 analyzes features of the ballistic spike itself by calculating the change in magnitude of measured accelerations between the pre-spike period and the time of occurrence of the ballistic spike, as well as the overall magnitude of the ballistic spike. In addition, features analyzed during the post-spike period are the minimum recoil value and its time of occurrence, the peak value of the muzzle lift and its time of occurrence, and the minimum and maximum accelerations along the Z-axis (as defined in FIG. 1), along with the time of occurrence of each. In addition, processor 230 applies a weighting scheme to the aforementioned features, where weights are assigned to each feature according to the relative importance of the feature in determining whether a ballistic spike corresponds to a gunshot.

Once processor 230 determines that the ballistic spike in the stored acceleration data does in fact correspond to the occurrence of a gunshot, the processor then transmits the acceleration data to a remote monitoring system 280. As shown in FIG. 2, gunshot detection system 200 includes (within housing 205) a communication device 250. In one or more embodiments, communication device 250 is a cellular modem chipset that communicates using, for example, 3G, 4G, or LTE mobile communication technology. In other embodiments, communication device 250 may be a Bluetooth adapter that communicates with a wireless router that itself handles remote communication over a broadband network.

As shown in the figure, processor 230 transmits data to remote monitoring system 280 via communication device 250. Communication device 250 forwards transmitted data over communication link 275 to remote monitoring system 280. Communication link 275 may be a cellular network connection, or, alternatively, the link may be a wireless local area network (LAN) that includes a router attached to a long-haul, broadband network (such as the Internet).

In addition to acceleration data, processor 230 also transmits information that corresponds to the location of gunshot detection system 200 to remote monitoring system 280. To enable this communication, housing 205 also encloses a global positioning system (GPS) chipset 240. GPS 240 is configured to monitor the location of gunshot detection system 200. Processor 230 samples the location of gunshot detection system 200 by communicating with GPS 240, and transmits location coordinates obtained from the sampling to remote monitoring system 280. The location information is transmitted along with the acceleration data in order to enable identification of the location of a potential gunshot event.

According to some embodiments, gunshot detection system 200 transmits a periodic status notification to remote monitoring system 280. The status notification provides the operators of the remote monitoring system with information that indicates that gunshot detection system 200 is operating normally, but has not detected a gunshot event. Further, the frequency of transmission of the status notifications is configurable. For example, gunshot detection system 200 may be configured to transmit a status notification every hour. The status notification can include device-specific information, such as a user identifier or serial number (described below). Further, processor 230 can be configured to periodically sample GPS 240 to obtain the location of gunshot detection system 200, and then to periodically transmit location coordinates to remote monitoring system 280 along with the status notification. This enables continuous location monitoring by the operators of the remote monitoring system.

In addition, as depicted in FIG. 2, housing 205 also encloses a video monitor 260 and an audio monitor 265. According to embodiments, video monitor 265 may be a micro video or pinhole camera, and audio monitor 265 may be a microphone. It should be noted that housing 205 can also enclose other types of sensors, such as thermal and biometric sensors. When processor 230 transmits acceleration data to remote monitoring system 280, the processor also samples either (or both of) video monitor 260 and audio monitor 265 in order to transmit video and audio signals to remote monitoring system 280 along with the acceleration data. The additional data accompanying the acceleration data provides the operators of remote monitoring system 280 with additional confirmatory and contextual information in connection with the detection of a potential gunshot event.

Further, processor 230 also determines device-specific information (such as a device serial number) that uniquely identifies gunshot detection system 200. Such information may be stored, for instance, in memory 200 when gunshot detection system 200 is initially configured. According to one or more embodiments, processor 230 periodically transmits this data to remote monitoring system 280 along with the location data for the system.

In addition, in order to provide electric power to the components enclosed by housing 205, the housing will enclose a battery (not shown in FIG. 2). And, the housing 205 may also enclose an inductive (i.e., wireless) charging circuit to power the other components enclosed therein.

Referring again to FIG. 2, remote monitoring system 280 is, according to embodiments, a general-purpose or server-class computer system that is located remotely from gunshot detection system 200, and is under the control of an operator, such as a police department, an authorized releasing authority, or other monitoring entity. Remote monitoring system 280 may, in some embodiments, be a laptop or tablet computing device. As shown in the figure, remote monitoring system 280 executes a software module depicted as weapon signature classifier 285. Weapon signature classifier 285 is configured to receive the acceleration data transmitted by processor 230, and to analyze whether the data meets a predetermined "weapon signature." A weapon signature is a an acceleration pattern that corresponds to a particular type of weapon, a particular caliber of weapon, or a particular manufacturer. For example, if a monitored individual fires a 9 millimeter Glock® pistol, then accelerometer 210 and processor 230 operate as previously described in order to determine that a series of accelerations detected after the firing of the weapon were indeed caused by a gunshot. Once the determination is made, and the acceleration data is transmitted to remote monitoring system 280, weapon signature classifier 285 then analyzes the acceleration data to determine whether the received acceleration data corresponds to (or matches) a predetermined weapon signature.

In order to make this determination, weapon signature classifier 285 performs lookup operations on weapon signature database 290. Weapon signature database 290 stores an assortment of weapons signatures (i.e., acceleration patterns) that correspond to different weapon types, calibers, and manufacturers. In accordance with one or more embodiments, weapon signature classifier 285 uses the received acceleration data (which may be considered an acceleration pattern) as lookup key for weapon signature database 290. If weapon signature classifier 285 locates an entry (i.e., weapon signature) in weapon signature database 290 that matches the received acceleration pattern, then weapon signature classifier 285 reports the weapon type, caliber, or manufacturer that corresponds to the located signature. Thus, in the example set forth above, the received acceleration pattern corresponding to the firing of the 9 millimeter Glock would match a stored weapon signature for that weapon. Therefore, not only would users of remote monitoring system 280 be able to detect the fact and location of the firing of a gun by a monitored individual, but would also be able to remotely determine the type, caliber, and manufacturer of the fired weapon.

Evaluation of the disclosed system and methods executed thereby consisted of three different subject pools. The first subject pool included ten officers from the University of Pennsylvania Police Department who were asked to participate in a shooting task with six handguns that ranged from a .22 caliber weapon to a .45 caliber weapon. Shot load varied from 36 grains to 230 grains, depending on the weapon caliber. Weapon weight varied from 0.70 to 1.10 kilograms. Weapons included a Rexio Arms .22 caliber revolver weighing 0.98 kg, a Smith & Wesson® .38 caliber (Model 6) revolver weighing 1.06 kg, a Taurus semi-automatic 9 mm pistol weighing 0.90 kg, two different Smith & Wesson M&P .40 caliber semi-automatic pistols weighing 0.70 kg, and a Colt .45 caliber semi-automatic pistol weighing 1.10 kg. These subjects were also instructed to use both one-handed and two-handed shooting grips. In addition, data was collected on subjects shooting using both right-handed and left-handed grips, but only the data from right-handed grips was used in the present analysis. However, one of the subjects in the training data was left-handed, resulting in the inclusion of dominant and non-dominant examples in the training data. The second subject pool consisted of two members of the general population who were asked to engage in their normal routine life activities from morning until evening. Finally, a sample of five construction workers were recruited and asked to engage in their normal construction tasks, including use of pneumatic nail guns, pneumatic jackhammers, .22 caliber powder-actuated fastener guns, as well as other construction tools.

Each subject was fitted on their right wrist with wearable tri-axis accelerometer, similar to those found in most smartphones, capable of recording acceleration up to 16 Gs at a rate of 3.2 kHz or 3 times per millisecond for extended periods (i.e., 2½ hours). Police subjects wore the sensors on both wrists for the duration of their shooting task (approximately 20 minutes), two construction workers engaged in demolition of concrete wore the sensors for two hours each, the three remaining construction workers engaged in framing work wore the sensors for 6 hours, and other control subjects wore the sensors for 6 to 8 hours at a time.

The resulting logged sensor data, consisting of over 68 hours of recordings, were pre-processed using a spike detector to identify all candidate ballistic spikes, as well as other spikes greater than or equal to 1.5 Gs over each 600 microsecond two sample window. Each candidate spike was defined as any 1.5 G magnitude increase preceded by an increase of less than 1.5 G. Feature windows covering the period from 7.5 milliseconds (ms) pre-spike to 45 ms post-spike were then constructed with a pre-spike window (i) covering −7.5 ms to 0.3 ms, a spike window (ii) covering 0.3 ms to 1 ms, and a post-spike window (iii) covering 1 ms to 45 ms.

Given the nature of the gunshot event, all extracted features were calculated in the time-domain. These included the pre-spike sum of the differences between the overall measured force vector and the acceleration due to gravity, muzzle blast spike magnitude, peak recoil acceleration value and location, peak lift value and location, as well as 23 other window features across all three axes. Pre-spike and spike statistical features were calculated using raw sensor data while post-spike window features were computed using smoothed sensor data filtered by locally-weighted regression methods to eliminate high frequency noise.

Feature selection was accomplished using penalized regression as implemented in the glmnet package in R. Using this method, which fits an L1-regularized logistic regression model to the full set of standardized features, features and corresponding feature weights were selected at the value of regularization parameter $\lambda$ that provided the minimum mean cross-validated classification error in a training sample composed of sensor data from five police officers and five other subjects. The resulting model excluded five statistical features and, contrary to expectation, selected feature weights for the remaining features that balanced feature size and location.

The trained classifier correctly classified all 1,378 control spikes in the training data as such and misclassified only one of the 359 gunshots for an overall sensitivity of 0.997 and a specificity of 1.000. Since no gunshots were excluded by the detector, these figures also describe the overall accuracy of the detector-classifier system. Examination of the two false negatives suggested that pre-spike motion on the Z-axis may have contributed to these misclassifications.

In order to verify that the gunshot classifier was not over-fitted to the training sample, a test sample composed of the gunshots from the five excluded police officers as well as the spikes from the remaining control subjects was classified using the trained gunshot classifier. Of 358 gunshots in the test data, 354 were correctly identified by the classifier, three were misclassified, and one was excluded from classification by the candidate detector. In addition, of the 693 confusable spikes, only three were classified as gunshots. This produced an overall sensitivity of 0.989 and a specificity of 0.996 for the detector-classifier system.

Further analysis revealed that the seven false negative misclassifications were not noticeably different than their neighboring gunshots except for perhaps having smaller magnitude blast wave spike features. Examination of the three false positive misclassifications found that all three differed visibly from gunshot events in having early y-axis peak lift values, excessive pre-spike activity on the z-axis, or too prolonged an x-axis spike.

Consistent with recent advances in human activity recognition, the present study investigated the possibility that firearm use could be reliably distinguished from routine human activities as well as known confusable activities involving other impulsive activities using MEMs inertial sensor technology. The results suggest that accelerometer-based classification of firearm use is feasible and could form the basis of a wearable and affordable gunshot detection sensor system. The apparent success of this recognition methodology likely results from several of the peculiar features of firearm usage. Unlike other impulsive events generated by the human body, firearm usage begins with an essentially stationary body necessitated by the aiming task. Metal-on-metal collisions generated by the hand, by contrast, are generally preceded by considerable pre-event accelerations. And, common impulsive events that happen to the human body, such as a collision or other physical impact, are not accompanied by a preceding blast wave. Similarly, the human-weapon system, having a center of mass below the barrel of the weapon, generates a muzzle lift feature, which aids in the classification task. This is most strikingly seen in the successful discrimination of .22 caliber firearm gunshots from .22 caliber powder-driven fasteners, both of which use the same explosive charge. Taken together, these three features contribute to the utility of wrist-measured acceleration as a method for detecting firearm utilization. In addition, given that single gunshots make up only a fraction of all non-self inflicted illegal firearm discharges, it is likely that a gun use detection system based on the underlying gunshot detector-classifier reported in this paper would have higher overall accuracy.

The disclosed subject matter provides for low-cost and low-energy motion sensors that can be used to identify firearm discharges. This development offers criminal justice practitioners a potential capability that overcomes the low signal-to-noise ratio that has characterized many location-based behavioral monitoring tools as well as low information gain of community-wide gunshot monitoring systems. This development would be more in keeping with the experience of remote monitoring technology for detection of substance abuse and the promise that if reliable and low-noise signals of other illegal conduct can be found, such conduct could be reduced through enhanced detection or deterrence.

Although one or more embodiments have been described herein in some detail for clarity of understanding, it should be recognized that certain changes and modifications may be made without departing from the spirit of the disclosure. The embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements can be made. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A system for detecting and monitoring firearm use by an individual, the system comprising:
   a wearable gunshot detection device comprising an accelerometer, a buffer, and a memory; and
   a remote monitoring system,
   wherein the wearable gunshot detection device is configured to be fastened to a wrist of the individual and is further configured to:

detect and measure, using the accelerometer, an acceleration corresponding to a movement of the wrist of the individual to which the gunshot detection device is fastened;

produce and store, in the buffer, acceleration data corresponding to the movement;

determine if the acceleration data includes a ballistic spike that tentatively corresponds to a gunshot fired by the individual;

if it is determined that the acceleration data includes the ballistic spike tentatively corresponding to the gunshot fired by the individual, transfer and store an amount of the acceleration data from the buffer to the memory;

determine if the amount of the acceleration data definitively corresponds to the gunshot fired by the individual, wherein the wearable gunshot detection device is further configured to:

determine and assign a first weight to a difference between a first acceleration detected during a time period preceding the ballistic spike and a second acceleration detected during a time period coinciding with the ballistic spike; and during a time period following the ballistic spike, determine and assign a second weight to a peak value of a muzzle lift, and determine and assign a third weight to a recoil acceleration; and if the amount of the acceleration data definitively corresponds to the gunshot fired by the individual, then transmit the amount of the acceleration data to the remote monitoring system.

2. The system of claim 1,
wherein the wearable gunshot detection device comprises:
a strap that is attachable to the wrist of the individual; and
a housing mounted on the strap, wherein the housing includes the accelerometer and the memory, wherein the accelerometer is configured to measure the acceleration corresponding to the movement of the wrist of the individual to which the gunshot detection device is fastened, to determine if the acceleration data includes the ballistic spike tentatively corresponding to the gunshot fired by the individual, and to transfer and store the amount of the acceleration data from the buffer to the memory.

3. The system of claim 2,
wherein the housing includes a processor,
wherein the processor is configured to:
read the amount of the acceleration data stored in the memory;
perform one or more computations on the amount of the acceleration data; and
determine if the amount of the acceleration data definitively corresponds to the gunshot fired by the individual to which the gunshot detection device is attached based on results of the one or more computations.

4. The system of claim 3, wherein the one or more computations include determining timing and magnitude of the ballistic spike, determining timing and magnitude of the recoil acceleration, and determining timing and magnitude of the muzzle lift.

5. The system of claim 3,
wherein the housing includes a communication device, and the processor is further configured to transmit, via the communication device, the amount of the acceleration data stored in the memory to the remote monitoring system when it is determined that the amount of the acceleration data definitively corresponds to the gunshot fired by the individual to which the gunshot detection device is attached.

6. The system of claim 5,
wherein the remote monitoring system includes a classification database and the remote monitoring system is configured to:
receive the amount of the acceleration data; read one or more weapon signatures from the classification database; and
compare the amount of the acceleration data with the one or more weapon signatures.

7. The system of claim 6,
wherein each weapon signature corresponds to one or more of a weapon type, a weapon caliber, and a weapon manufacturer.

8. The system of claim 5,
wherein the strap is electrically connected to the housing and is formed of a signal conducting material, and wherein, if the signal conducting material is cut, a tamper detection circuit included in the housing is activated.

9. The system of claim 5,
wherein the housing includes therein a global positioning system (GPS) chipset.

10. The system of claim 5,
wherein the housing includes therein an audio monitor.

11. The system of claim 5,
wherein the housing includes therein a video monitor.

12. The system of claim 5,
wherein the housing is waterproofed.

13. The system of claim 5,
wherein the housing further includes therein at least one of a battery and a wireless charging circuit.

14. The system of claim 3, wherein the processor is configured to determine if the amount of the acceleration data definitively corresponds to the gunshot fired by the individual by dividing the amount of the acceleration data into three segments comprising:
a pre-spike time period;
a time period corresponding to the detected ballistic spike; and
a post-spike time period.

15. The system of claim 1,
wherein the acceleration data comprises one or more of an acceleration detected in a direction corresponding to a horizontal plane running from the wrist to an elbow of the individual, an acceleration detected in a direction corresponding to a vertical plane running from a base of a hand through a tip of a thumb of the individual, and an acceleration detected in a direction corresponding to a plane running through, and perpendicular to, a palm of the hand of the individual.

16. The system of claim 1, wherein the amount of the acceleration data transferred from the buffer to the memory includes data preceding the ballistic spike and data following the ballistic spike.

17. The system of claim 16, wherein the data preceding the ballistic spike comprises 25 milliseconds and the data proceeding the ballistic spike comprises 25 milliseconds.

18. The system of claim 1, wherein the accelerometer determines that the ballistic spike tentatively corresponds to the gunshot fired by the individual if the acceleration data stored in the buffer indicates a first acceleration in a direction of one axis preceded by a second acceleration lower than the first acceleration in the direction of the one axis.

19. The system of claim 1, wherein the buffer is disposed in the accelerometer.

20. The system of claim 1, wherein the buffer is disposed in the housing.

* * * * *